(12) United States Patent
Deshpande et al.

(10) Patent No.: US 12,012,930 B2
(45) Date of Patent: Jun. 18, 2024

(54) SYSTEM AND METHOD FOR PREVENTING PITCH BEARING FAILURES IN A WIND TURBINE USING PITCH MOTOR SIGNALS

(71) Applicant: General Electric Company, Schenectady, NY (US)

(72) Inventors: Ameet Shridhar Deshpande, Schenectady, NY (US); John Joseph Mihok, Schenectady, NY (US); Ashley Simone Wilford, Greenville, SC (US); Michael James Rizzo, Glenville, NY (US); Santiago Murcia, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 112 days.

(21) Appl. No.: 17/772,685

(22) PCT Filed: Oct. 30, 2019

(86) PCT No.: PCT/US2019/058693
§ 371 (c)(1),
(2) Date: Apr. 28, 2022

(87) PCT Pub. No.: WO2021/086338
PCT Pub. Date: May 6, 2021

(65) Prior Publication Data
US 2023/0003192 A1    Jan. 5, 2023

(51) Int. Cl.
*F03D 7/02* (2006.01)
*F03D 7/04* (2006.01)
*F03D 80/70* (2016.01)

(52) U.S. Cl.
CPC ............. *F03D 7/0224* (2013.01); *F03D 7/04* (2013.01); *F03D 7/045* (2013.01); *F03D 80/701* (2023.08);
(Continued)

(58) Field of Classification Search
CPC .......... F03D 7/0224; F03D 7/04; F03D 7/045; F03D 80/701; F05B 2260/79; Y02E 10/72
See application file for complete search history.

(56) References Cited

U.S. PATENT DOCUMENTS 8,162,608 B2    4/2012    Birkemose et al.
8,317,462 B2    11/2012    Daniels et al.
(Continued)

FOREIGN PATENT DOCUMENTS

CN    105134510 A    12/2015
CN    106930907 A    7/2017
(Continued)

OTHER PUBLICATIONS

Zhao et al (CN 207485607) English Translation (Year: 2017).*
(Continued)

*Primary Examiner* — Brian Christopher Delrue
(74) *Attorney, Agent, or Firm* — Dority & Manning, P.A.

(57) ABSTRACT

A method for preventing a pitch bearing failure of a pitch system of a wind turbine includes monitoring, via at least one sensor, one or more electrical signals of a pitch motor of a pitch drive mechanism of the pitch system that drives a pitch bearing of the pitch system. The method also includes analyzing, via the controller, the one or more electrical signals of the pitch motor so as to remove noise and amplify outliers. Moreover, the method includes estimating bearing friction of the pitch bearing using the analyzed one or more electrical signals of the pitch motor. As such, the method includes implementing, via the controller, a control action when the estimated bearing friction of the pitch bearing indicates an anomaly in the pitch bearing.

16 Claims, 8 Drawing Sheets

(52) U.S. Cl.
CPC ..... *F05B 2260/79* (2013.01); *F05B 2260/902* (2013.01)

(56) References Cited

U.S. PATENT DOCUMENTS

| | | | | |
|---|---|---|---|---|
| 11,767,821 B2* | 9/2023 | Meesala | ............... | F03D 17/00 290/44 |
| 2002/0105189 A1* | 8/2002 | Mikhail | ............... | F03D 7/043 290/44 |
| 2003/0111842 A1* | 6/2003 | Gilbreth | ............... | H02J 9/08 290/52 |
| 2009/0171509 A1* | 7/2009 | Lindahl | ............... | H02J 3/381 700/292 |
| 2011/0018269 A1* | 1/2011 | Moser | ............... | F03D 15/00 290/55 |
| 2020/0055587 A1* | 2/2020 | Randall | ............... | B64C 11/008 |

FOREIGN PATENT DOCUMENTS

| | | |
|---|---|---|
| CN | 107689059 A | 2/2018 |
| CN | 207485607 U | 6/2018 |
| CN | 107327367 B | 12/2018 |
| CN | 108932580 A | 12/2018 |
| CN | 109444740 A | 3/2019 |

OTHER PUBLICATIONS

PCT International Search Report & Written Opinion Corresponding to PCT/US2019/058693 on Jun. 26, 2020.

He et al., Remote Monitoring and Diagnostics of Pitch Bearing Defects in a MW-Scale Wind Turbine Using Pitch Symmetrical-Component Analysis, 2019 IEEE Energy Conversion Congress and Exposition, Sep. 29, 2019, pp. 1-6. https://ieeexplore.ieee.org/document/8912664.

* cited by examiner

SYSTEM AND METHOD FOR PREVENTING PITCH BEARING FAILURES IN A WIND TURBINE USING PITCH MOTOR SIGNALS

RELATED APPLICATIONS

The present application claims priority to PCT Application Serial Number PCT/US2019/058693, filed on Oct. 30, 2019, which is incorporated by reference herein.

FIELD

The present disclosure relates generally to wind turbines, and more particularly to systems and methods for detecting pitch bearing anomalies in a wind turbine using pitch motor signals.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, the wind turbine may adjust a pitch angle of one or more of the rotor blades via a pitch drive mechanism configured with a pitch bearing to change the angle of the blades with respect to the wind.

Typical pitch drive mechanisms include pitch drive motor, a pitch drive gearbox, and a pitch drive pinion. In such configurations, the pitch drive motor is coupled to the pitch drive gearbox so that the pitch drive motor imparts mechanical force to the pitch drive gearbox. Similarly, the pitch drive gearbox may be coupled to the pitch drive pinion for rotation therewith. The pitch drive pinion may, in turn, be in rotational engagement with the pitch bearing coupled between the hub and a corresponding rotor blade such that rotation of the pitch drive pinion causes rotation of the pitch bearing. Thus, in such embodiments, rotation of the pitch drive motor drives the pitch drive gearbox and the pitch drive pinion, thereby rotating the pitch bearing and the rotor blade about the pitch axis.

Since the pitch bearing allows the rotor blades to move, failure of one of the pitch bearings requires a turbine shut down event, thereby decreasing annual energy production. Pitch bearing failures may occur for a variety of reasons, including for example, loading due to turbulence, shear, thrust, etc., pitching activity (ball bunching, pitch travel, the number of pitch cycles, etc.), bearing design, and/or lubrication. In addition, pitch bearings are very costly to replace in the event of a failure due to the need of a large crane.

Accordingly, the present disclosure is directed to systems and methods for detecting pitch bearing anomalies in a wind turbine using signals from the pitch motors so as to avoid a failure event.

BRIEF DESCRIPTION

Aspects and advantages of the invention will be set forth in part in the following description, or may be obvious from the description, or may be learned through practice of the invention.

In one aspect, the present disclosure is directed to a method for preventing a pitch bearing failure of a pitch system of a wind turbine. The method includes monitoring, via at least one sensor, one or more electrical signals of a pitch motor of a pitch drive mechanism of the pitch system that drives a pitch bearing of the pitch system. The method also includes analyzing, via the controller, the one or more electrical signals of the pitch motor so as to remove noise and amplify outliers. Moreover, the method includes estimating bearing friction of the pitch bearing using the analyzed one or more electrical signals of the pitch motor. As such, the method includes implementing, via the controller, a control action when the estimated bearing friction of the pitch bearing indicates an anomaly in the pitch bearing.

In an embodiment, the electrical signal(s) may include, for example, current, voltage, power, and/or torque. In another embodiment, the filter(s) may include a low-pass filter, a high-pass filter, a band-pass filter or combinations thereof.

Thus, in an embodiment, analyzing the electrical signal(s) of the pitch motor so as to remove the noise and amplify outliers may include filtering the electrical signal(s) of the pitch motor over the predetermined time period. For example, in one embodiment, filtering the electrical signal(s) of the pitch motor over the predetermined time period may include determining a mean drift in the electrical signal(s) of the pitch motor over the predetermined time period and removing the mean drift from the electrical signal(s) of the pitch motor for the predetermined time period to reduce noise of the one or more operational signals due to an aerodynamic torsional moment on the rotor blade.

In another embodiment, filtering the electrical signal(s) of the pitch motor over the predetermined time period may include removing noise due to pitch accelerating torque by detecting a component of motor torque leading pitch rate in phase by 90 degrees and removing the component from the one or more electrical signals, removing noise due to aerodynamic steady state torsional torque by detecting mean drift in motor torque and removing the mean drift from the one or more electrical signals, and normalizing a metric of friction with pitch travel and bearing load.

In further embodiments, estimating the bearing friction of the pitch bearing using the analyzed one or more electrical signals of the pitch motor may include generating, via the controller, a predictive computer model of the pitch bearing using the electrical signal(s) of the pitch motor and one or more operational signals of the pitch system. For example, in an embodiment, the operational signal(s) of the pitch system may include temperature, ball bearing friction, cage stress, operational hours, thrust, brake activation, or pitching activity of the pitch drive mechanism. More specifically, the pitching activity may include pitch motor energy per degree of pitch travel, amount of pitching, pitch angle, or any other suitable pitching activity.

In additional embodiments, the electrical signal(s) of the pitch motor comprises the current. In such embodiments, analyzing the electrical signal(s) of the pitch motor so as to remove noise and amplify outliers may include altering the current using at least one of a root-mean-square, a standard deviation, or power of the pitch motor to obtain an altered current value and generating a heat map of the pitch bearing as a function of wind speed and time for the predetermined time period using the altered current value.

In several embodiments, estimating the bearing friction of the pitch bearing using the analyzed one or more electrical signals of the pitch motor may include determining a frictional power loss of the pitch bearing from the heat map. In another embodiment, the method may include generating the heat map of the pitch bearing using a digital twin model.

Thus, in certain embodiments, implementing the control action when the estimated bearing friction of the pitch bearing indicates an anomaly in the pitch bearing may include implementing the control action when the frictional power loss of the pitch bearing exceeds a predetermined threshold.

In another aspect, the present disclosure is directed to a system for preventing a pitch bearing failure of a pitch system of a wind turbine. The system includes at least one sensor configured for monitoring one or more electrical signals of a pitch motor of a pitch drive mechanism of the pitch system that drives a pitch bearing of the pitch system. The system also includes a controller communicatively coupled to the sensor(s). The controller includes at least one processor configured to perform a plurality of operations, including but not limited to analyzing the one or more electrical signals of the pitch motor so as to remove noise and amplify outliers, estimating bearing friction of the pitch bearing using the analyzed one or more electrical signals of the pitch motor, and implementing a control action when the estimated bearing friction of the pitch bearing indicates an anomaly in the pitch bearing. It should also be understood that the system may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
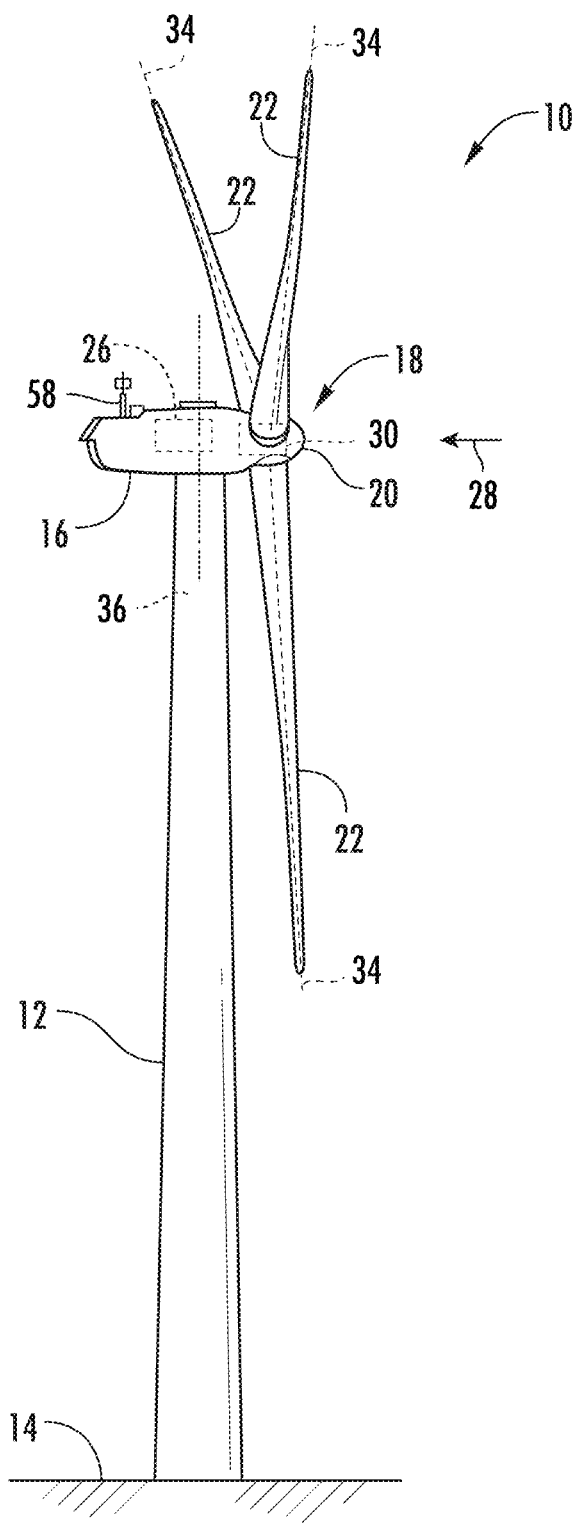
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for detecting pitch bearing anomalies in a wind turbine using signals from the pitch motors so as to avoid a failure event. As generally understood, pitch motors move wind turbine rotor blades. Thus, the signals from such motors (e.g. current, voltage, power, air-gap torque, temperature, pitch travel, etc.) offer valuable insight and can be used in numerous ways according to the present disclosure. For example, in an embodiment, the pitch motor signals can be used to estimate bearing friction and detect various bearing and pitch motor failure modes causes by, e.g. lack of lubrication, grease leakage, seal break, cage overlap, cage protrusion and liberation, ball bunching, raceway degradation and truncation, ball wear/breaking, pitch motor degradation, etc. Further, the systems and methods of the present disclosure can reduce noise in such data by averaging and emphasizing outliers to develop a time-varying covariate that can guide inspections, life extending mitigations like debris removal, greasing, resealing, prognostics on when a bearing may fail, and replacement scheduling for greatest crane productivity.

In further embodiments, the pitch signals can be used to estimate aerodynamic torsional torque by measuring pitch motor counter torque, which can be used to detect blade misalignment, blade wear, icing and wind estimation. Moreover, the pitch signals can be used to detect pitch motor control instability and torsional resonance instability in blades as well as to estimate blade torsional frequency. In addition, by collecting the pitch signals, pitching activity can also be monitored and flagged if too high, since increased pitching activity can be caused by closed-loop instability.

In still further embodiments, the pitch signals can be normalized for pitch travel and used to estimate net bearing tribology parameters such as friction coefficient, slip at maximum friction, power loss in frictional hysteresis and so on, which may help further differentiate and pinpoint failure modes. Moreover, the pitch signals can be used to estimate the contribution to pitch torque due to gravity and blade bending, use such to estimate blade flap stiffness and blade deflection and possibly shear.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
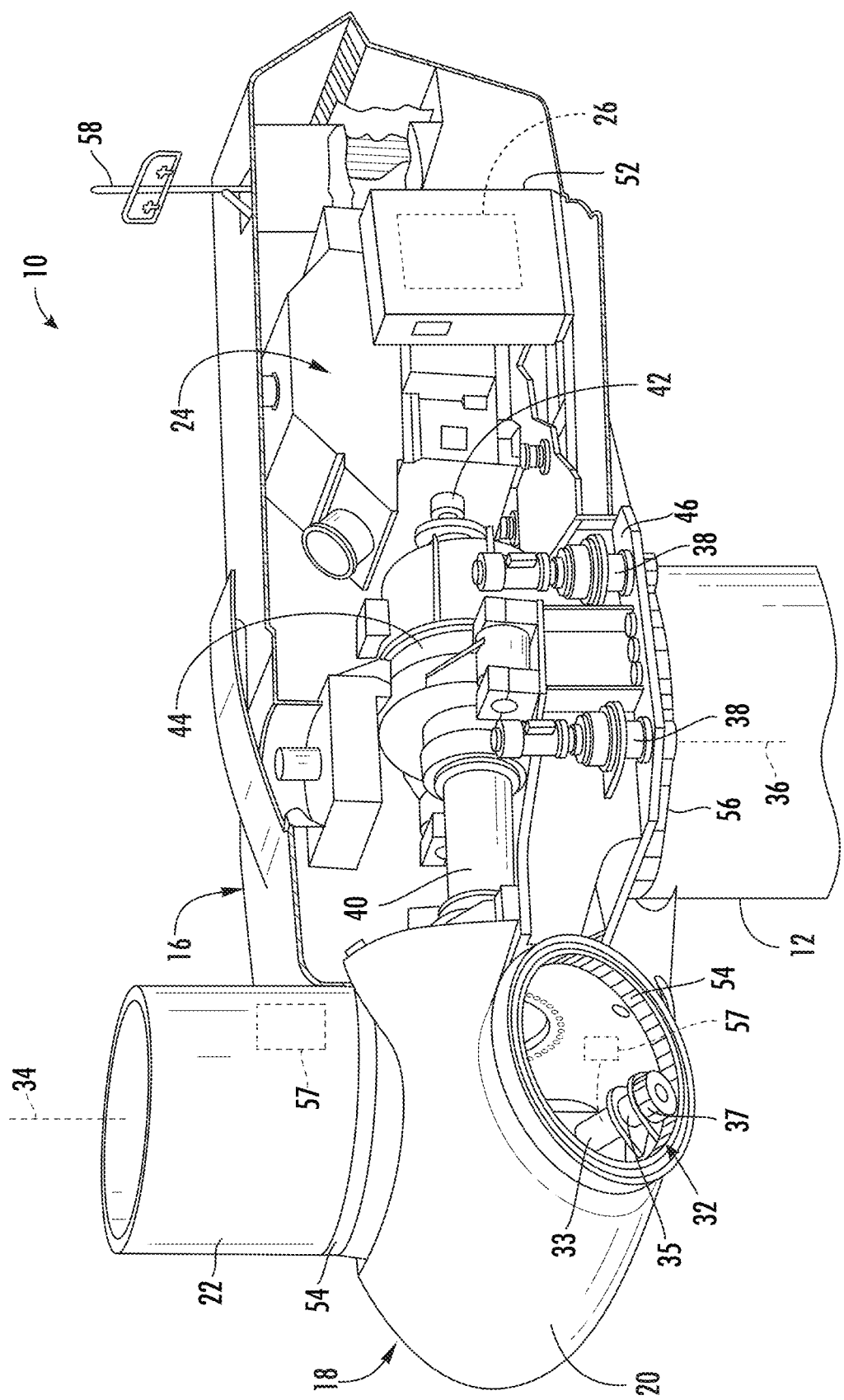
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

Further, the turbine controller 26 may also be communicatively coupled to each pitch adjustment mechanism 32 of the wind turbine 10 (one of which is shown) through a separate or integral pitch controller 30 (FIG. 1) for controlling and/or altering the pitch angle of the rotor blades 22 (i.e., an angle that determines a perspective of the rotor blades 22 with respect to the direction 28 of the wind).

In addition, as shown in FIG. 2, one or more sensors 57, 58 may be provided on the wind turbine 10. More specifically, as shown, a wind sensor 58 may be provided on the wind turbine 10. For example, the wind sensor 58 may a wind vane, and anemometer, a LIDAR sensor, or another suitable sensor that measures wind speed and/or direction. In addition, a pitch sensor 57 may be configured with each of the pitch drive mechanism 32, e.g. to monitor various parameters of the pitch motor 33. As such, the sensors 57, 58 may further be in communication with the controller 26, and may provide related information to the controller 26. For example, the pitch sensor(s) 59 may correspond to temperature sensors that send temperature signals to the controllers 26, 30 to indicate an actual temperature of the pitch batteries, which is described in more detail herein.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
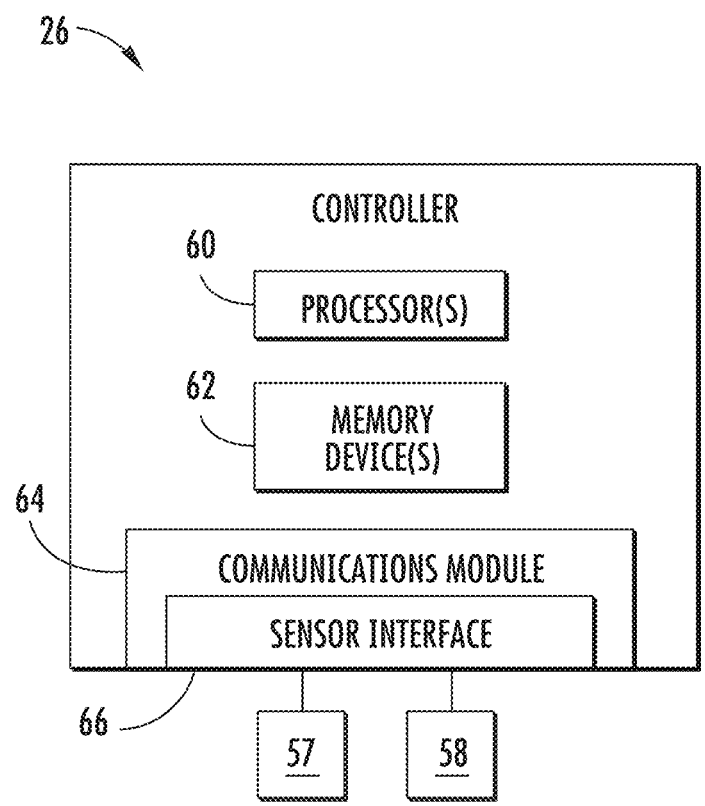
FIG. 3 illustrates a schematic diagram of one embodiment of suitable components that may be included in a wind turbine controller according to the present disclosure.
Figure 4:
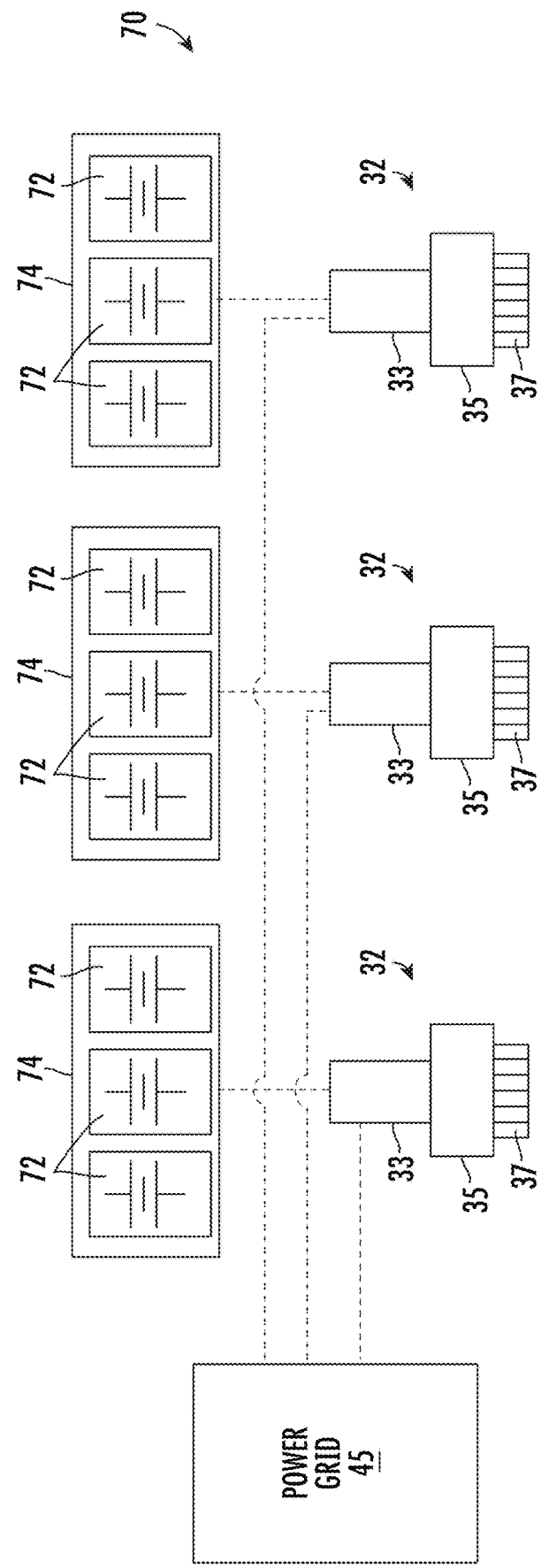
FIG. 4 illustrates a schematic diagram of one embodiment of a pitch system of a wind turbine according to the present disclosure.

Referring now to FIG. 3, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from one or more sensors 57, 58 to be converted into signals that can be understood and processed by the processors 60. It should be appreciated that the sensors 57, 58 may be communicatively coupled to the communications module 64 using any suitable means. For example, as shown in FIG. 3, the sensors 57, 58 are coupled to the sensor interface 66 via a wired connection. However, in other embodiments, the sensors 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 5:
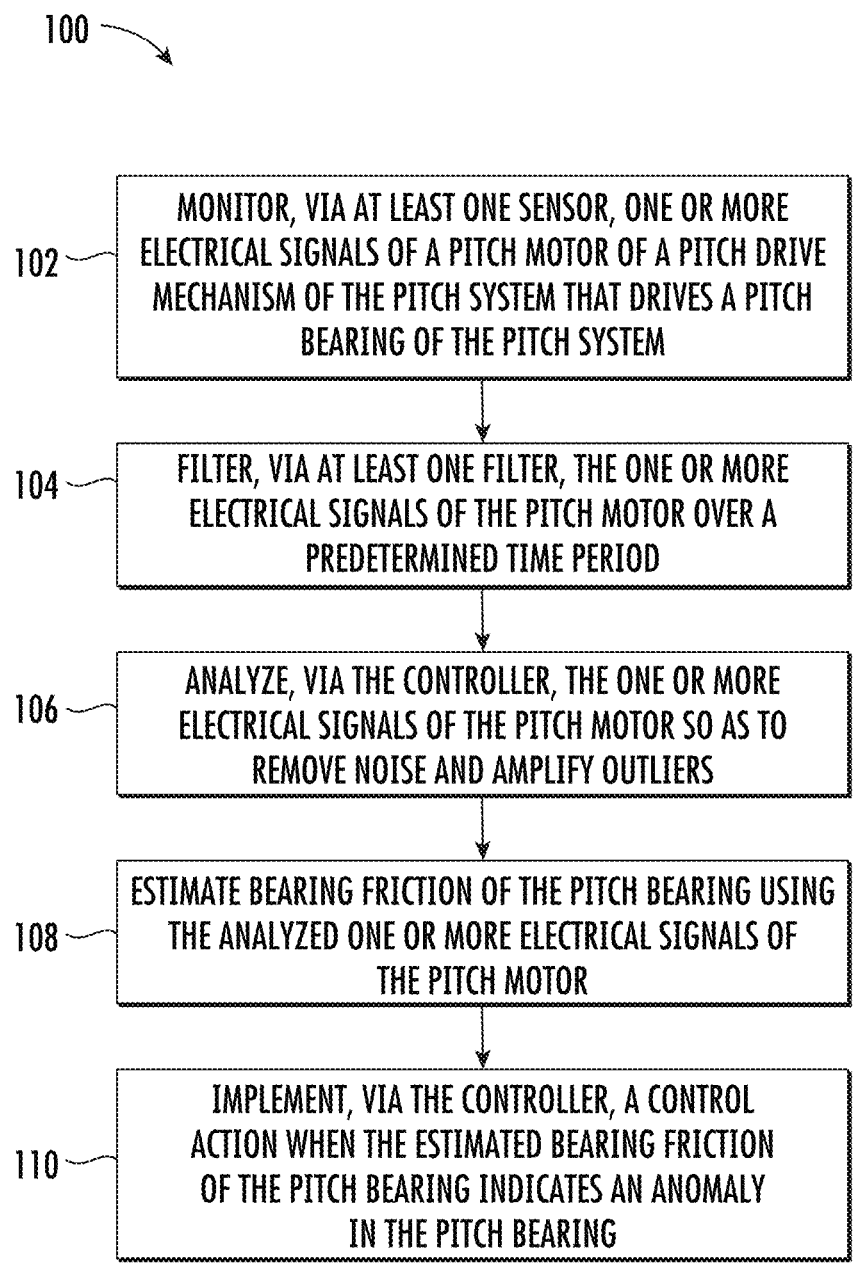
FIG. 5 illustrates a flow diagram of one embodiment of a method for preventing a pitch bearing failure of a pitch system of a wind turbine according to the present disclosure.
Figure 6:
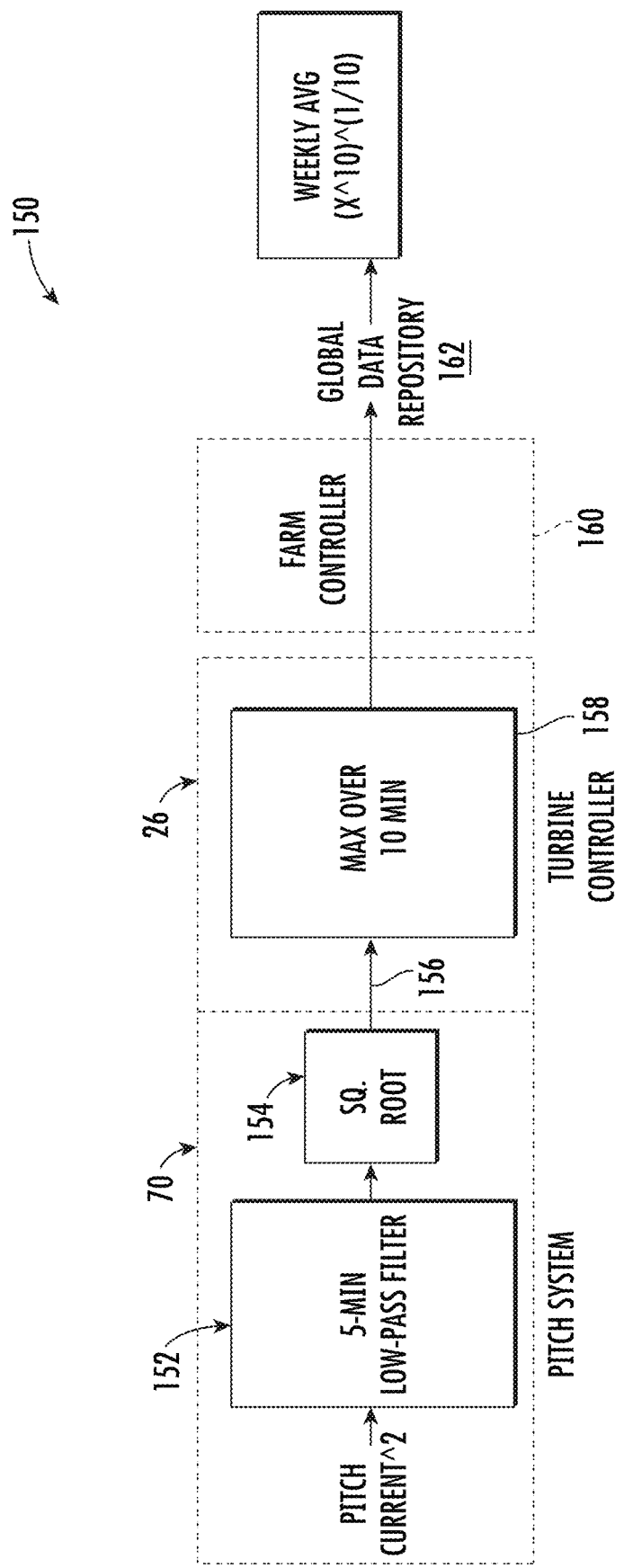
FIG. 6 illustrates a schematic diagram of one embodiment of a system for preventing a pitch bearing failure of a pitch system of a wind turbine according to the present disclosure.
Figure 7:
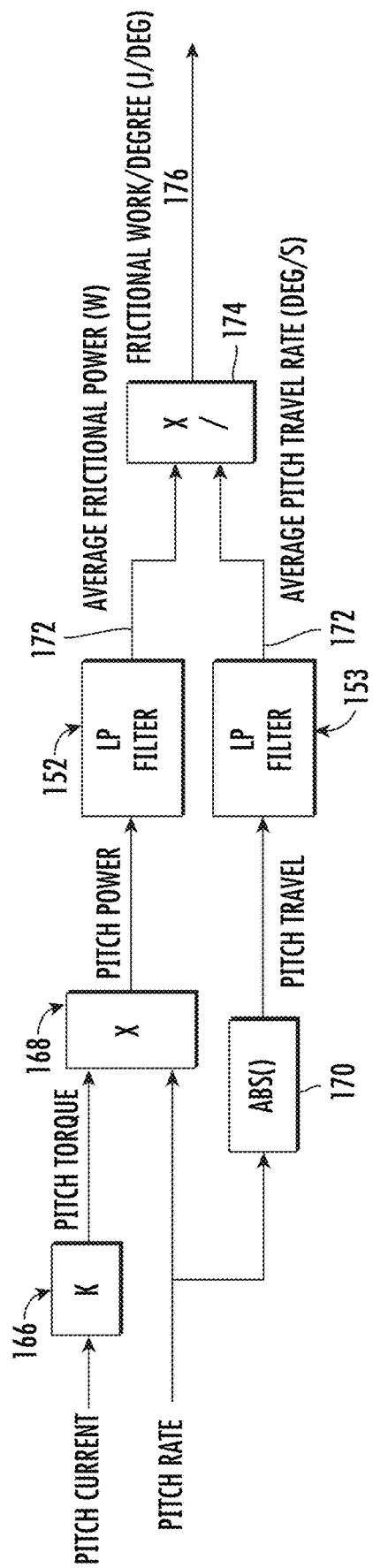
FIG. 7 illustrates a schematic diagram of another embodiment of a system for preventing a pitch bearing failure of a pitch system of a wind turbine according to the present disclosure.

Referring now to FIGS. 5-7, systems and methods for preventing pitch bearing failures are illustrated in accordance with aspects of the present disclosure. More specifically, FIG. 5 illustrates a flow diagram of an embodiment of a method 100 for preventing a pitch bearing failure of a pitch system according to the present disclosure. FIG. 6 illustrates a schematic diagram of one embodiment of system 150 for preventing a pitch bearing failure of a pitch system according to the present disclosure. FIG. 7 illustrates a schematic diagram of another embodiment of system 150 for preventing a pitch bearing failure of a pitch system according to the present disclosure.

Referring particularly to FIG. 5, in general, the method 100 is described herein as implemented using, for example, the pitch system 70 described above. However, it should be appreciated that the disclosed method 100 may be implemented using any other suitable pitch system now known or later developed in the art. In addition, although FIG. 5 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (102), the method 100 includes monitoring, via at least one sensor (e.g. sensor(s) 57), one or more electrical signals of the pitch motor 33 of the pitch drive mechanism 32 of the pitch system 70. For example, in an embodiment, the electrical signal(s) may include, for example, current, voltage, power, and/or torque. For example, as shown in FIGS. 6 and 7, the electrical signal(s) may be pitch current.

Referring back to FIG. 5, as shown at (104), the method 100 includes filtering, via at least one filter, the electrical signal(s) of the pitch motor 33 over a predetermined time period. For example, in an embodiment, the filter(s) may include a low-pass filter, a high-pass filter, a band-pass filter or combinations thereof. More specifically, as shown in FIGS. 6 and 7, the pitch current may be filtered via a low-pass filter 152.

Referring back to FIG. 5, as shown at (106), the method 100 includes analyzing, e.g. via the pitch system 70 and/or the turbine controller 26, the electrical signal(s) of the pitch motor 33 so as to remove noise and amplify outliers. For example, in an embodiment, the method 100 may include determining a mean drift in the electrical signal(s) of the pitch motor 33 over the predetermined time period and removing the mean drift from the electrical signal(s) of the pitch motor 33 for the predetermined time period to reduce noise of the operational signal(s) due to an aerodynamic torsional moment on the rotor blade 22.

In another embodiment, the method 100 may also include removing noise due to pitch accelerating torque by detecting a component of motor torque leading pitch rate in phase by ninety degrees (90°) and removing the component from the electrical signal(s). Moreover, the method 100 may include removing noise due to aerodynamic steady state torsional torque by detecting mean drift in motor torque and removing the mean drift from the electrical signal(s). In such embodiments, the method 100 may include normalizing a metric of friction with pitch travel and bearing load, e.g. so as to further improve diagnostic accuracy and make the method 100 robust to variations in pitch travel and loads.

Thus, as shown at block 154 in FIG. 6, in an embodiment, the pitch system 70 may be configured to analyze the electrical signal(s) of the pitch motor 33 by altering the pitch current using at least one of a root-mean-square, a standard deviation, and/or power of the pitch motor 33 to obtain an altered current value 156. As shown at 158, the turbine controller 26 may then determine a maximum value over a certain time interval, such as 10 minutes. Such maximum values may also be stored in a global data repository 162, e.g. of a farm-level controller 160. Thus, by monitoring the maximum values of pitch current, the system 150 provides improved monitoring of pitch bearing failures.

More specifically, referring back to FIG. 5, as shown at (108), the method 100 further includes estimating bearing friction of the pitch bearing 54 using the analyzed electrical signal(s) of the pitch motor 33. For example, in an embodiment, the bearing friction may be estimated by generating, via the turbine controller 26, a predictive computer model of the pitch bearing 54 using the electrical signal(s) of the pitch motor 33 and one or more operational signals of the pitch system 70. For example, in an embodiment, the operational signal(s) of the pitch system 70 may include temperature, ball bearing friction, cage stress, operational hours, thrust, brake activation, or pitching activity of the pitch drive mechanism 32.

More specifically, as shown in FIG. 7, the pitching activity may include pitch rate, pitch motor energy per degree of pitch travel, amount of pitching, pitch angle, or any other suitable pitching activity. Further, as shown at 166, the pitch torque may be determined as a function of the pitch current. In addition, as shown at 168, the pitch rate may be used to determine the pitch power, e.g. by multiplying the pitch torque by the pitch rate. Furthermore, as shown in FIG. 7, the pitch rate may be used to determine the pitch travel, e.g. by determining the absolute value of the pitch rate as shown at 170. Moreover, as shown, the pitch travel can also be filtered via a low-pass filter 153. The outputs 172, 173 of the low-pass filters 152, 153 represent an average frictional power and an average pitch travel rate, respectively. Thus, as show, the controller 26 can determine the frictional work 176, which can be used to indicate an anomaly in the pitch bearing 54.

Figure 8A:
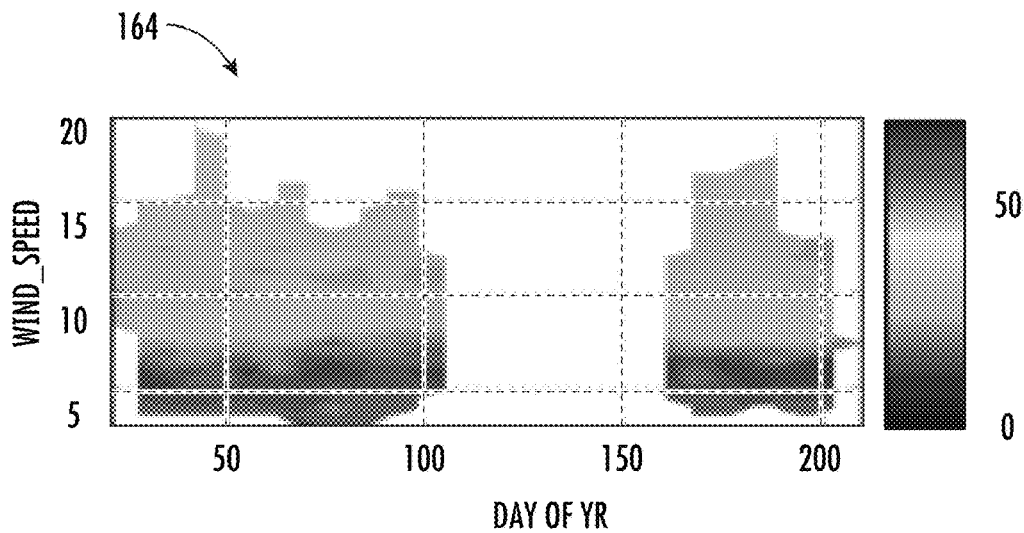
FIGS. 8A-8C illustrate sample heat maps according to the present disclosure, particularly illustrated a damaged pitch bearing as compared to the other two healthy pitch bearings of the same wind turbine.
Figure 8B:
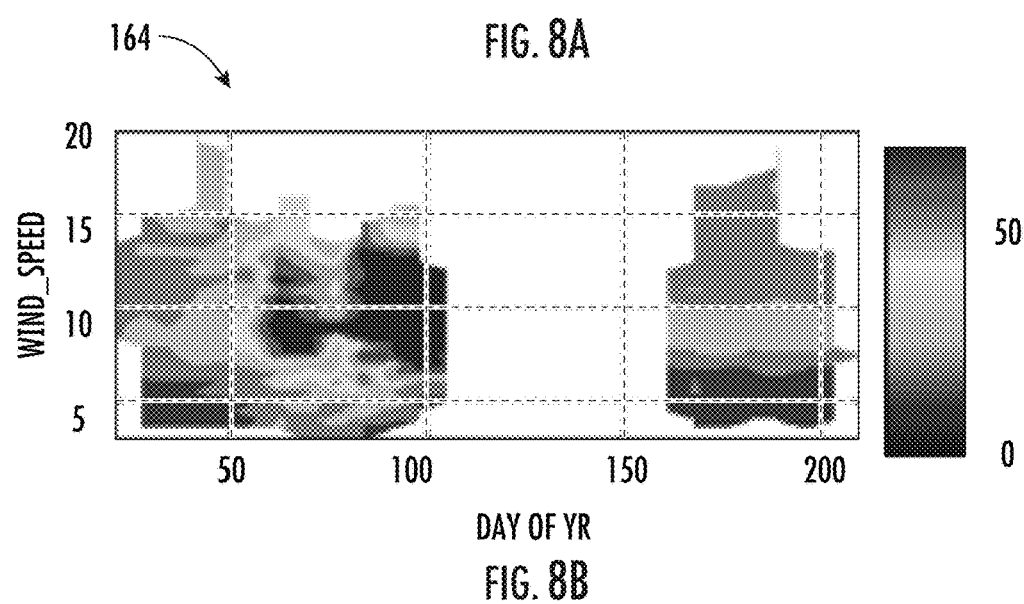
Figure 8C:
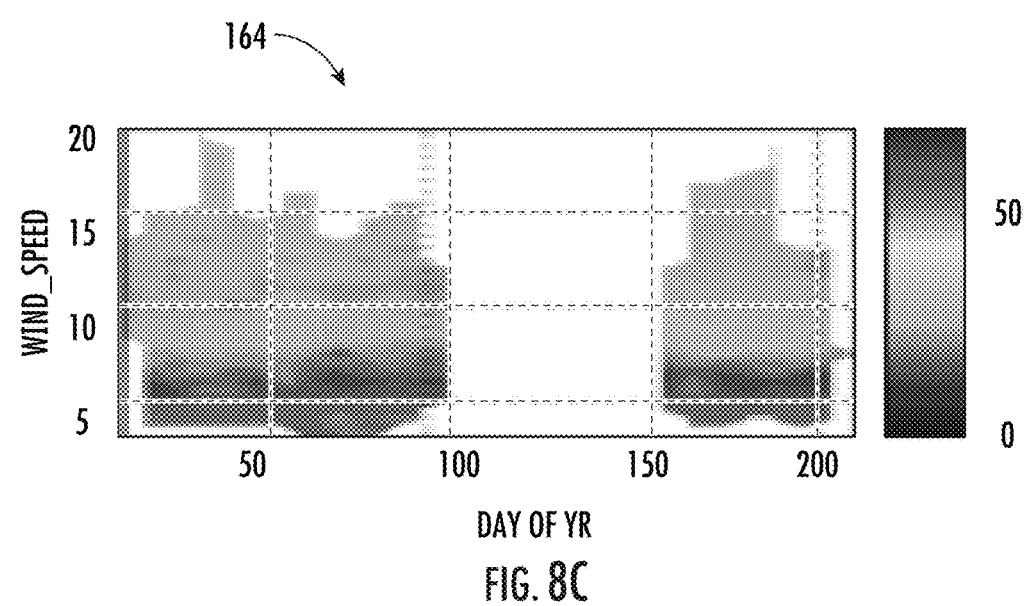

Thus, in certain embodiments, as shown in FIGS. 8A-8C, the method 100 may include generating a heat map 164 of the pitch bearing 54 as a function of wind speed and time for the predetermined time period using the altered current value. For example, in an embodiment, the method 100 may include generating the heat map 164 of the pitch bearing 54 using a digital twin model. Thus, as shown in FIGS. 8A-8C, a damaged pitch bearing (FIG. 8B) can be easily detected, e.g. by comparing heat maps for all pitch bearings 54 across all of the rotor blades 22 of the wind turbine 10.

Referring back to FIG. 5, as shown at (110), the method 100 includes implementing, via the turbine controller 26, a control action when the estimated bearing friction of the pitch bearing 54 indicates an anomaly in the pitch bearing 54. For example, in an embodiment, the method 100 may include determining a frictional power loss of the pitch bearing 54, e.g. from the heat map 164. Thus, in certain embodiments, implementing the control action when the estimated bearing friction of the pitch bearing 54 indicates an anomaly in the pitch bearing 54 may include implementing the control action when the frictional power loss of the pitch bearing 54 exceeds a predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing a pitch bearing failure of a pitch system of a wind turbine, the method comprising:
monitoring, via at least one sensor, one or more electrical signals of a pitch motor of a pitch drive mechanism of the pitch system that drives a pitch bearing of the pitch system;
analyzing, via a controller, the one or more electrical signals of the pitch motor so as to remove noise and amplify outliers; wherein analyzing the one or more electrical signals of the pitch motor further comprises filtering the one or more electrical signals of the pitch motor over a predetermined time period, wherein filtering the one or more electrical signals of the pitch motor over the predetermined time period further comprises:
determining a mean drift in the one or more electrical signals of the pitch motor over the predetermined time period; and
removing the mean drift from the one or more electrical signals of the pitch motor for the predetermined time period to reduce noise of the one or more operational signals due to an aerodynamic torsional moment on the rotor blade;
estimating bearing friction of the pitch bearing using the analyzed one or more electrical signals of the pitch motor; and
implementing, via the controller, a control action when the estimated bearing friction of the pitch bearing indicates an anomaly in the pitch bearing.

2. The method of claim 1, wherein the one or more electrical signals comprises at least one of current, voltage, power, or torque.

3. The method of claim 1, wherein analyzing the one or more electrical signals of the pitch motor so as to remove the noise and amplify outliers further comprises filtering the one or more electrical signals of the pitch motor over the predetermined time period.

4. The method of claim 2, wherein estimating the bearing friction of the pitch bearing using the analyzed one or more electrical signals of the pitch motor further comprises generating, via the controller, a predictive computer model of the pitch bearing using the one or more electrical signals of the pitch motor and one or more operational signals of the pitch system.

5. The method of claim 4, wherein the one or more operational signals of the pitch system comprise at least one of temperature, ball bearing friction, cage stress, operational hours, thrust, brake activation, or pitching activity of the pitch drive mechanism.

6. The method of claim 5, wherein the pitching activity comprises at least one of pitch motor energy per degree of pitch travel, amount of pitching, or pitch angle.

7. The method of claim 6, wherein the one or more electrical signals of the pitch motor comprises the current, and wherein analyzing the one or more electrical signals of the pitch motor so as to remove noise and amplify outliers further comprises:
altering the current using at least one of a root-mean-square, a standard deviation, or power of the pitch motor to obtain an altered current value; and,
generating a heat map of the pitch bearing as a function of wind speed and time for the predetermined time period using the altered current value.

8. The method of claim 7, wherein estimating the bearing friction of the pitch bearing using the analyzed one or more electrical signals of the pitch motor further comprises determining a frictional power loss of the pitch bearing from the heat map.

9. The method of claim 7, further comprising generating the heat map of the pitch bearing using a digital twin model.

10. The method of claim 7, wherein implementing the control action when the estimated bearing friction of the pitch bearing indicates an anomaly in the pitch bearing further comprises implementing the control action when the frictional power loss of the pitch bearing exceeds a predetermined threshold.

11. A system for preventing a pitch bearing failure of a pitch system of a wind turbine, the system comprising:
at least one sensor configured for monitoring one or more electrical signals of a pitch motor of a pitch drive mechanism of the pitch system that drives a pitch bearing of the pitch system;
a controller communicatively coupled to the at least one sensor, the controller comprising at least one processor configured to perform a plurality of operations, the plurality of operations comprising:
analyzing the one or more electrical signals of the pitch motor so as to remove noise and amplify outliers;
estimating bearing friction of the pitch bearing using the analyzed one or more electrical signals of the pitch motor, wherein estimating the bearing friction of the pitch bearing using the analyzed one or more electrical signals of the pitch motor further comprises generating a predictive computer model of the pitch bearing using the one or more electrical signals of the pitch motor and one or more operational signals of the pitch system; and
implementing a control action when the estimated bearing friction of the pitch bearing indicates an anomaly in the pitch bearing.

12. The system of claim 11, wherein the one or more electrical signals comprises at least one of current, voltage, power, or torque.

13. The system of claim 11, wherein analyzing the one or more electrical signals of the pitch motor so as to remove the noise and amplify outliers further comprises filtering the one or more electrical signals of the pitch motor over the predetermined time period.

14. The system of claim 13, wherein filtering the one or more electrical signals of the pitch motor over the predetermined time period further comprises:
determining a mean drift in the one or more electrical signals of the pitch motor over the predetermined time period; and, removing the mean drift from the one or more electrical signals of the pitch motor for the predetermined time period to reduce noise of the one or more operational signals.

15. The system of claim 11, wherein the one or more electrical signals of the pitch motor comprises the current, and wherein analyzing the one or more electrical signals of the pitch motor so as to remove noise and amplify outliers further comprises:
   altering the current using at least one of a root-mean-square, a standard deviation, or power of the pitch motor to obtain an altered current value; and,
   generating a heat map of the pitch bearing as a function of wind speed for the predetermined time period using the altered current value.

16. The system of claim 15, wherein estimating the bearing friction of the pitch bearing using the analyzed one or more electrical signals of the pitch motor further comprises determining a frictional power loss of the pitch bearing from the heat map, and wherein implementing the control action when the estimated bearing friction of the pitch bearing indicates an anomaly in the pitch bearing further comprises implementing the control action when the frictional power loss of the pitch bearing exceeds a predetermined threshold.

* * * * *